Nov. 28, 1961    A. H. THOMPSON ET AL    3,010,177
METHOD OF MANUFACTURING POROUS REFRACTORY
INSULATING MATERIALS
Filed Dec. 2, 1957
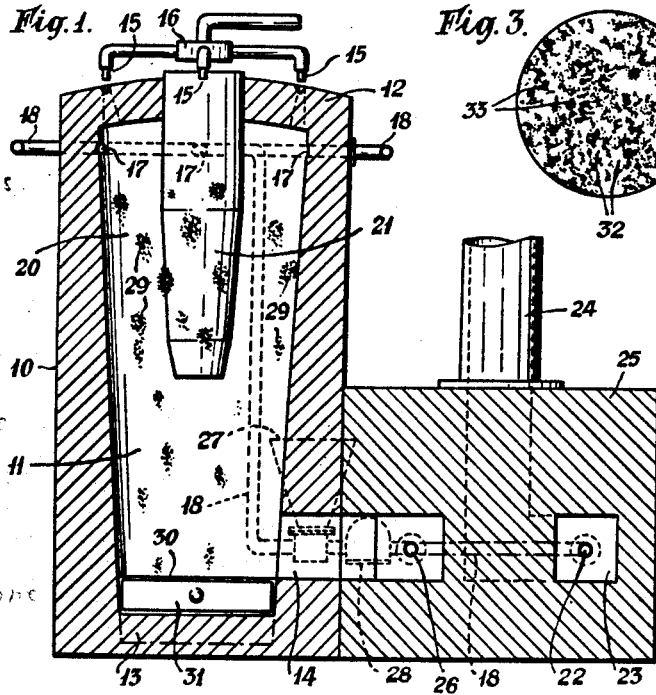
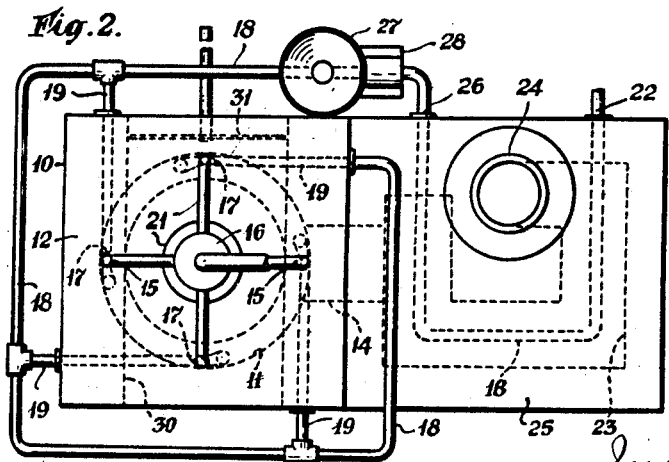
Inventors
Arthur Herbert Thompson,
Fred Bragg Littlewood
and Arthur Marshall
By Robert Henderson
attorney United States Patent Office 3,010,177
Patented Nov. 28, 1961

3,010,177
METHOD OF MANUFACTURING POROUS REFRACTORY INSULATING MATERIALS
Arthur Herbert Thompson and Fred Wragg Littlewood, Wrexham, and Arthur Marshall, Bradfield, England, assignors to Thomas Marshall & Company (Loxley) Limited, Loxley, near Sheffield, England, a company of Great Britain and Northern Ireland
Filed Dec. 2, 1957, Ser. No. 700,177
Claims priority, application Great Britain Dec. 4, 1956
7 Claims. (Cl. 25—156)

This invention relates to a method of manufacturing refractory insulating materials and refractory insulating products therefrom.

Hitherto, in some instances refractory insulating bricks have been made from refractory material, usually fire-clay or kaolin, and formed in such a way as to be very porous, therefore of low density. Their thermal conductivity is substantially proportional to their density, that is, the higher the porosity the lower the thermal conductivity. They are used for the lining of furnaces and the like for conservation of heat.

The generally accepted method of making such bricks is to mix with plastic refractory clay a combustible material, frequently saw-dust. This mixture is moulded into a brick shape, dried and then fired in a kiln which burns out the combustible material, leaving a porous structure in the finished product. Because of the high shrinkage that occurs in this process it is very difficult to make bricks with a sufficient degree of accuracy for their purpose unless they are made oversize and subsequently ground to size on suitable grinding machinery which is both expensive and wasteful. Furthermore, the manufacture of such bricks is a lengthy process and their burning in bulk is difficult to control and results in high losses.

Another known method is to obtain porosity in a brick by causing the mixture from which the brick is made to contain a large quantity of gas bubbles. This is generally referred to as the foaming or frothing process and suffers from the disadvantage that it is difficult to control the size, shape and density of the resulting brick.

Still another known method is to mix dry ground clay with a combustible material, usually coal or coke, and fire this on a sintering machine which, in burning out the combustible produces a porous "grog." This can then be crushed, mixed with a bonding clay and moulded into a brick shape, dried and subsequently fired in a kiln to provide the finished shape. By such method it is possible to produce accurately sized bricks but it is usually limited to the use of clays in which there is a bloat or expansion of the grains during the sintering process. For this and other reasons highly refractory clays cannot be used, firstly because they do not have a bloating tendency and secondly because the clays become contaminated with the ash of the coal or coke with which they are mixed to form a sinter which lowers their refractoriness and thus limits this process to the production of relatively low temperature insulating bricks. Further, this method does not usually produce a mass of sufficiently low density or high porosity to make a highly efficient brick and results in a grog having a packing density of the order of 50 lbs. or more, per cubic foot, when graded to a size suitable for brick making.

In yet another known method, as in the McLaughlin Patent No. 2,676,892, argillaceous material, while suspended in a gaseous medium in finely divided discrete particle form, is subjected to a sufficiently high temperature for a controlled period of time to effect complete fusion of the particles, while so suspended, and the particles are then cooled to formed hardened unicellular speroidal particles that remain discrete and unagglomerated. According to that patent, however, the invention is limited to the use of argillaceous material of such characteristics that the particles thereof have a tendency to bloat or swell under the heat treatment to which they are subjected as outlined in the patent so that each particle will expand into a unicellular thin-walled hollow sphere.

An object of the present invention is to provide a method of producing a highly porous refractory insulating material in which refractory material in discrete particle form is fed into a furnace chamber and subjected to a sintering heat treatment and to a movement therein which effects impingement of the particles indiscriminately one against another while in contact with the heat in the furnace chamber at a degree of temperature and for a sufficient length of time which renders the particles pyro-plastic, that is to say, sufficiently soft and sticky, short of complete fusion, such that said particles are caused to adhere one to another and thereby accumulate into artificially formed highly porous agglomerate masses of particles said masses being made or allowed to discharge from the furnace chamber and to cool into sintered and hard artificially formed refractory masses of high porosity.

It is also an object to produce, by the method of this invention, a new product comprising a highly porous artificially formed agglomerate mass composed of a plurality of sintered particles and clusters of particles of refractory material adhering one to another and forming an irregular shape with interspaces between the particles and clusters of particles, said interspaces providing the high degree of porosity in said masses.

A further object of the invention is to provide a mix for the production of a porous refractory insulating shape comprising artificially formed agglomerate masses of sintered particles of refractory material and a bonding material and in which said masses are each of a size screened to not larger than ⅜" wire mesh.

A still further object of the invention is to provide a moulded shape composed of highly porous pre-sintered agglomerate masses of refractory material bonded together by a hydration-setting bonding medium.

Yet a further object of the invention is to provide an improved apparatus for carrying out the method of the invention.

These and other objects of the invention will be apparent from the following description and claims, reference being had to the accompanying diagrammatic drawings.

In these drawings:

FIG. 1 is a vertical section of one form of apparatus for carrying out the method of this invention.

FIG. 2 is a plan of same.

FIG. 3 is a drawing of a photo-micrograph at 15 magnifications, of the surface of a very thin section cut from a small agglomerate mass which has been broken away from a larger agglomerate mass produced according to this invention.

As shown in FIGS. 1 and 2 of the drawings a brickwork structure 10 of rectangular outline in cross section encloses a vertical furnace chamber 11 of circular cross section tapering downwardly from a crown roof 12 towards the floor 13. An opening 14 is provided in the lower part of the furnace chamber for the exhaust therefrom of waste gases.

The upper part of the furnace chamber 11 is supplied with a combustible medium by four burners 15 firing downwardly through the roof 12 tangentialwise at approximately 30° to the vertical, said burners being supplied with combustible medium from a source of supply (not shown) conveyed through a manifold pipe structure 16.

Immediately below the roof 12 the furnace chamber 11 is provided at circumferential intervals with four secondary air inlets 17 to which preheated secondary air is conveyed by a supply pipe 18 and branch pipes 19 of which the latter communicate one each with an inlet 17.

The secondary air inlets 17 are arranged to communicate into the furnace chamber 11 tangentially thereof and thereby impart a swirling action to the secondary air and to the combustible medium entering the furnace chamber from the burners 15.

Depending from the roof 12 centrally of and downwardly into the furnace chamber for a distance which constitutes the hot zone 20 thereof is a pillar 21 of round cross section which imparts an annular formation to said hot zone 20.

The secondary air is supplied in preheated condition by the supply end 22 of pipe 18 entering into and passing through a waste gas flue 23 which communicates the exit opening 14 in the furnace chamber 11 with a chimney 24 of the structure 25, said secondary air pipe becoming heated by contact with the hot waste gases leaving the furnace chamber.

Where the secondary air supply pipe leaves the flue 23 as shown at 26 said pipe is fitted with a feed hopper 27 at the pressure side of a fan 28.

The material to be treated in the furnace chamber is fed is discrete form into the hopper 27 and owing to the action of the fan 28 operating in the secondary air supply pipe 18 the particles of said material are entrained in the preheated secondary air and fed therewith into the hot zone 20 of the furnace chamber to be given a violet swirling action therein while being subjected to a sufficiently high temperature and for a length of time to ensure that the particles become pyro-plastic.

As starting material, the particles may have a moisture content as high as 15% by weight but it is preferable that it shall not exceed 5%.

Owing to the annular formation of the hot zone 20 of the furnace chamber 11 the effect of a cyclone is produced upon the particles by the violent swirling action imparted to them and a consequent centrifugal force is generated which causes the particles to impinge against one another and against the surface of the furnace chamber and the surface of the central pillar such that as the particles reach their pyro-plastic condition they adhere to one another and in batches upon said surfaces and grow into agglomerate masses as shown at 29 in FIG. 1 until they become massive enough to fall by gravity from said surfaces on to the floor of the furnace chamber and consequently to a cooler zone of said chamber.

The temperature required in the hot zone of the furnace will vary within the range of 1000° C. to 1750° C. according to the particular refractory material to be used and the temperature at which the particles thereof become pyro-plastic. The material to be used need not be such that the particles thereof possess plasticity in their untreated condition and the particle size is such as to be readily carried in suspension in the turbulent hot gases.

One example of refractory material which may be used and which would become pyro-plastic from 1250° C. to 1300° C. is a typical fireclay comprising the following analysis:

| | Percent by weight |
|---|---|
| $SiO_2$ | 46.55 |
| $Al_2O_3$ | 31.94 |
| $Fe_2O_3$ | 3.04 |
| $TiO_2$ | 1.28 |
| CaO | 0.25 |
| MgO | 0.77 |
| $Na_2O$ | 0.30 |
| $K_2O$ | 2.33 |
| Loss on ignition | 13.35 |

Another example of a refractory material and one which would become pyro-plastic from 1600° C. to 1650° C. is Sillimanite having the following analysis:

| | Percent by weight |
|---|---|
| $SiO_2$ | 35.70 |
| $Al_2O_3$ | 62.28 |
| $Fe_2O_3$ | 1.74 |
| $TiO_2$ | 0.18 |
| MgO | 0.13 |
| CaO | Trace |

The floor 13 of the furnace chamber may be inclined downwardly towards a discharge opening 30 so that the agglomerate masses will discharge themselves from the furnace chamber as they fall or be pushed out manually by a scoop 31 for cooling off.

The artificially formed highly porous agglomerate masses of a size as received from the furnace may be broken down into smaller agglomerate masses and graded to size suitable for use in making light-weight refractory concrete, or they may be broken into still smaller agglomerate masses suitable for use in making porous refractory insulating bricks or other shapes from a mix which includes said still smaller sized agglomerate masses and a hydration setting bonding medium, water being added to form the necessary wet mix for moulding to the required shape.

The porosity of the artificially formed hardened masses is produced by the presence of spaces between adhering clusters of particles as well as adhering individual particles which is substantially the structure of said masses resulting directly from the before described treatment to which the particles have been subjected.

When the agglomerate masses are to be used for the manufacture of porous refractory insulating bricks or other shapes, said masses, as discharged from the furnace chamber but in cooled and hardened condition, are broken up into small masses by passing them through wire mesh rolls (not shown) and screening them into various sizes and graded for the largest size to pass through not larger than 3/8" wire mesh but preferably not larger than a 3/16" wire mesh screen and these along with the still smaller sizes are mixed together with a suitable slip consisting of water and a binder to form a wet-mix, said binder consisting of particles of unburned argillaceous material. An additive may be included in the mix, consisting of at least one of the following: Sulphite lye and core gum or similar bonding agents.

When agglomerate masses produced according to this invention, as received from the furnace, are broken up and graded, they have a packing density of from 15 lbs. to 45 lbs. per cubic foot according to the grading.

It will be seen from FIG. 3 of the drawings that an artificially formed agglomerate mass produced according to this invention and one which is of a size small enough for inclusion in a mix for moulding into a porous refractory brick, is of high porosity owing to the spaces 32 occurring between the adhering clusters of particles 33.

With respect to the accompanying claims, the references therein to the introduction of a substantial volume of gas "approximately horizontally" into the hot zone is not intended to refer to the introduction of such gas in a precisely horizontal direction but is intended to comprehend introduction of such gas into the hot zone at a direction near enough to horizontal as to maintain the violent swirling action and consequent centrifugal force which is mentioned in this specification with reference to the gas and the particles.

What we claim is:

1. The method according to claim 7, wherein said hot zone is annular and said horizontally introduced gas, and the entrained particles therein, are introduced tangentially into said hot zone and thereby given a swirling action therein.

2. The method according to claim 7, wherein said hot zone is annular and said horizontally introduced gas, and the entrained particles therein, are introduced tangentially into an upper area of said hot zone and thereby given a swirling action in said hot zone.

3. The method according to claim 7, wherein said horizontally introduced gas is preheated prior to its introduction into the furnace.

4. The method according to claim 7, wherein said particles at the time of entrainment in the horizontally introduced gas have a moisture content of not more than 15% by weight.

5. The method according to claim 7, wherein said horizontally introduced gas is a combustion supporting gas.

6. The method according to claim 7, wherein said hot zone is heated by the burning of combustible gas introduced thereinto at a level above the level of introduction thereinto of said combustion supporting gas and said particles entrained in the latter gas.

7. The method of manufacturing highly porous refractory insulating material which comprises introducing a combustible mixture of gas into an upper portion of a furnace chamber and burning said gas to heat said upper portion and constitute it a hot zone, leaving a lower portion of said chamber as a cooler zone, a substantial volume of said gas being introduced approximately horizontally and forcefully into said hot zone to establish and maintain a swirling action of the gas in said hot zone, entraining discrete particles of refractory material in the horizontally introduced gas to cause said particles to enter said hot zone and violently swirl about therein and impinge upon surfaces of said chamber, and controlling the heat in said hot zone to maintain therein a sintering temperature, short of a complete fusion temperature, with respect to said particles to cause the latter to cling to each other and to said surfaces to agglomerate upon the latter into masses of such particles with interspaces therebetween, and permitting said masses to cling to said surfaces until the weight of said masses causes them to break away from said surfaces and fall to said cooler zone for removal therefrom; said particles being of such small size as to be readily carried in suspension in the swirling gas in said hot zone.

References Cited in the file of this patent
UNITED STATES PATENTS

| | | |
|---|---|---|
| 2,209,170 | Nevin et al. | July 23, 1940 |
| 2,430,601 | Cleary | Nov. 11, 1947 |
| 2,469,081 | Ruedi | May 3, 1949 |
| 2,543,987 | Ramsay | Mar. 6, 1951 |
| 2,572,484 | Howle et al. | Oct. 23, 1951 |
| 2,619,776 | Potters | Dec. 2, 1952 |
| 2,630,310 | Harshberger | Mar. 3, 1953 |
| 2,670,298 | Jensen et al. | Feb. 23, 1954 |
| 2,676,892 | McLaughlin | Apr. 27, 1954 |